US012134859B2

(12) United States Patent
Lappalainen et al.

(10) Patent No.: US 12,134,859 B2
(45) Date of Patent: Nov. 5, 2024

(54) DETERMINING THE REDUCTION RATE OF A RECOVERY BOILER (71) Applicant: ANDRITZ OY, Helsinki (FI)

(72) Inventors: Heikki Lappalainen, Varkaus (FI); Juho Nurmi, Varkaus (FI); Sauli Rissanen, Kotka (FI); Esa Vihavainen, Varkaus (FI)

(73) Assignee: Andritz Oy, Helsinki (FI)

( * ) Notice: Subject to any disclaimer, the term of this patent is extended or adjusted under 35 U.S.C. 154(b) by 229 days.

(21) Appl. No.: 17/612,191

(22) PCT Filed: May 15, 2020

(86) PCT No.: PCT/FI2020/050324
§ 371 (c)(1),
(2) Date: Nov. 17, 2021

(87) PCT Pub. No.: WO2020/234511
PCT Pub. Date: Nov. 26, 2020

(65) Prior Publication Data
US 2022/0220671 A1  Jul. 14, 2022

(30) Foreign Application Priority Data

May 17, 2019  (FI) ...................................... 20195410

(51) Int. Cl.
*D21C 11/10*  (2006.01)
*F23N 1/04*  (2006.01)
(Continued)

(52) U.S. Cl.
CPC ............... *D21C 11/10* (2013.01); *F23N 1/042* (2013.01); *F23N 5/082* (2013.01); *G01N 21/251* (2013.01);
(Continued)

(58) Field of Classification Search
CPC .......... D21C 11/10; D21C 7/12; D21C 11/12; F23N 1/042; F23N 5/082; F23N 5/08;
(Continued)

(56) References Cited

U.S. PATENT DOCUMENTS 3,870,467 A * 3/1975 Nelson ..................... F23N 5/08
436/79
4,695,881 A 9/1987 Kennedy et al.
(Continued)

FOREIGN PATENT DOCUMENTS

CA  1166842  5/1984
CN  101484633  7/2009
(Continued)

OTHER PUBLICATIONS

International Search Report for PCT/FI2020/050324 dated Jul. 27, 2020, 4 pages.
(Continued)

*Primary Examiner* — Jacob T Minskey
*Assistant Examiner* — Matthew M Eslami
(74) *Attorney, Agent, or Firm* — Nixon & Vanderhye P.C.

(57) ABSTRACT

A method to determine a reduction rate of a recovery boiler using optical information from a chemical smelt sample. A processor is used to read a digital frame at least part of which represents the chemical smelt sample of the recovery boiler. An area of interest is determined from the digital frame read comprising at least part of the area in the digital frame representing the chemical smelt sample. Of the pixel values of the area of interest, one or more spectral characteristic values correlating with the change of reduction rate are determined. The reduction rate of the recovery boiler is determined using a reduction rate function of one or more of the determined spectral characteristic values weighted at predetermined weights.

12 Claims, 4 Drawing Sheets (51) Int. Cl.
*F23N 5/08* (2006.01)
*G01N 21/17* (2006.01)
*G01N 21/25* (2006.01)
*G01N 21/27* (2006.01)

(52) U.S. Cl.
CPC ..... *G01N 21/27* (2013.01); *G01N 2021/1776* (2013.01); *G01N 2201/1296* (2013.01)

(58) Field of Classification Search
CPC ............... G01N 21/251; G01N 21/27; G01N 2021/1776; G01N 2201/1296; G01N 2201/129; G01N 21/31; G01N 21/00; G01N 21/25; G01N 21/255; G01N 33/343; G01J 2003/466; G01J 3/50; G01J 5/60

See application file for complete search history.

(56) References Cited

U.S. PATENT DOCUMENTS

| | | | |
|---|---|---|---|
| 5,006,937 | A | 4/1991 | Nonoshita et al. |
| 5,616,214 | A | 4/1997 | Leclerc |
| 9,915,589 | B2 | 3/2018 | Carlier et al. |
| 10,012,616 | B2 | 7/2018 | Aura et al. |
| 2002/0043192 | A1 | 4/2002 | Philippe et al. |
| 2005/0134853 | A1 | 6/2005 | Ingleson et al. |
| 2009/0139468 | A1* | 6/2009 | Saviharju ............... G01N 21/84 122/448.1 |
| 2018/0080173 | A1 | 3/2018 | Koskinen et al. |

FOREIGN PATENT DOCUMENTS

| | | |
|---|---|---|
| DE | 10 2009 037 706 | 2/2011 |
| EP | 0 150 910 | 8/1985 |
| EP | 0 947 625 | 10/1999 |
| EP | 1 914 477 | 4/2008 |
| EP | 3 431 654 | 1/2019 |
| JP | 50-13296 | 2/1975 |
| JP | 62-49112 A | 3/1987 |
| JP | 6-330489 A | 11/1994 |
| JP | 07055653 | 3/1995 |
| JP | 2002-202946 | 7/2002 |
| JP | 2007-515640 A | 6/2007 |
| JP | 2008-519231 A | 6/2008 |
| RU | 2672226 | 11/2018 |
| WO | 02/071170 | 9/2002 |
| WO | 2006/048495 A1 | 5/2006 |
| WO | 2018/147788 | 8/2018 |
| WO | 2018/229334 | 12/2018 |

OTHER PUBLICATIONS

Written Opinion of the ISA for PCT/FI2020/050324 dated Jul. 27, 2020, 8 pages.
JP Office Action with English Translation cited in Japanese Patent Application No. 2021-564130 mailed Nov. 1, 2023, 6 pages.
Decision to Grant issued in Russian Application No. 2021137186 with English Translation mailed Mar. 27, 2024, 17 pages.
Paula Ruiz et al., "Modelling a Biomass Boiler Using an Artifical Neural Network", published Sep. 30, 2016, 8 pages.
Translation of Search Report cited in Russian Application No. 2021137186 mailed.
Tran et al, The fluidity of recovery boiler smelt, Sep. 2006, Journal of Pulp and Paper Science, vo. 32 No. 3, p. 1-6 (Year: 2006.
Tavares et al., Effect pf the Char Bed Temperature and Temperature Distribution on Fume Generation in a Kraft Recovery Boiler, 1997, engineering and Papermakers Conference, p. 1153-1158 (Year: 1997).
Empie, Jeff H. and and Armstead, Daniel A.: "Smelt Sampling Probe for Use in the Kraft Recovery Boiler", Nordic Pulp and Paper Research Journal, vol. 19, No. 1, 2004, pp. 93-96.
International Search Report for PCT/FI2020/050455 dated Oct. 7, 2020, 7 pages.
Written Opinion of the ISA for PCT/FI2020/050455 dated Oct. 7, 2020, 8 pages.
U.S. Appl. No. 17/623,236, filed Dec. 27, 2021.
Non-Final Office Action cited in U.S. Appl. No. 17/623,236, mailed Mar. 27, 2023, 12 pages.

* cited by examiner

DETERMINING THE REDUCTION RATE OF A RECOVERY BOILER

RELATED APPLICATION

This application is the U.S. national phase of International Application PCT/FI2020/050324, filed May 15, 2020, which designated the U.S. and claims priority to Finnish Patent Application FI 20195410, filed May 17, 2017, the entire contents of each of which are hereby incorporated by reference.

FIELD OF THE INVENTION

The invention applies to determining the reduction rate of a recovery boiler using optical information from a chemical smelt sample.

BACKGROUND

In principle, a recovery boiler has two primary functions, chemical recovery and the recovery of combustion heat generated in the process as steam and thermal energy. The chemical smelt flowing out of the bottom of the recovery boiler furnace through smelt spouts contains sodium sulphide, sodium carbonate and sodium sulphate. Essential for the efficiency of the chemical recovery performed by the recovery boiler is the reduction rate, indicating the amount of sodium sulphate reduced to sodium sulphide. The reduction rate, also referred to below as reduction, is determined as a percentage. The measured reduction is used, for example, to control the fuel feed of the recovery boiler and the combustion air quantities of different levels in order to optimise combustion. Reduction has been measured through a laboratory analysis of the sample taken from the smelt flow into a glass tube and through measurements of the concentration of molten salt (green liquor) dissolved in the dissolving tank, which may have been done through optical methods as well. These measurement methods and the regulation of a recovery boiler based on measurement results have been described, for example, in publications US2018080173 and U.S. Pat. No. 5,616,214.

The measurement of reduction both in the solidified salt sample and the green liquor in the solution tank causes a very large delay in the measurement results. Laboratory testing of samples always causes a delay of hours. Even if the analysis of green liquor is implemented through online measurements, a delay will inevitably be integrated into the measurements due to the mixing and slowish changing of the content of the dissolving tank. In addition, the analysis of green liquor produces an average of the contents of smelt flow from different smelt spouts, i.e. it cannot highlight the differences in combustion in different parts of the combustion chamber. The largest recovery boilers are over 20 metres wide and may include more than 10 smelt spouts. Combustion conditions may therefore be different at different sides and at the centre, for example.

SUMMARY OF THE INVENTION

In accordance with the first characteristic of the present invention, a method is presented for determining the reduction rate of a recovery boiler. The method comprises the steps of:
  reading with processor a digital frame at least part of which represents a chemical smelt sample of the recovery boiler;
  determining from the digital frame read with the processor, an area of interest comprising at least part of the area in the digital frame representing the chemical smelt sample.
  determining with the processor from the pixel values of the determined area of interest, one or more spectral characteristic values correlating with the change of reduction rate;
  determining with the processor the reduction rate of the recovery boiler using a reduction rate function of one or more of the determined spectral characteristic values weighted at predetermined weights.

In accordance with the second characteristic of the present invention, a computer program product is presented comprising at least one computer-readable storage medium comprising a group of commands that, when run by one or more processors, make a computer device carry out the method according to the first characteristic.

In accordance with the third characteristic of the present invention, a computer device is presented comprising
  at least one processor;
  at least one memory comprising computer program code, wherein the at least one memory and of the computer program code have been arranged with at least one processor to make the computer device:
  read a digital frame at least part of which represents a chemical smelt sample of a recovery boiler;
  determine an area of interest from the digital frame read comprising at least part of the area in the digital frame representing the chemical smelt sample;
  determine one or more spectral characteristic values from the pixel values of the determined area of interest correlating with the change of reduction rate; and
  determine the reduction rate of the recovery boiler using a reduction rate function of one or more of the determined spectral characteristic values weighted at predetermined weights.

In accordance with the fourth characteristic of the present invention, a system is presented comprising
  a sampler for drawing a sample from the chemical smelt sample of the recovery boiler;
  means for generating a digital frame from the chemical smelt sample drawn from the recovery boiler with the sampler
  the computer device in accordance with the third characteristic.

In one application of the invention, the predetermining of said weights comprises
  determining with a laboratory measurement of the chemical smelt sample of the recovery boiler to determine a reduction rate of the recovery boiler to be used as a target value;
  producing a digital calibration frame representing said chemical smelt sample of the recovery boiler and determining said on or more spectral characteristic values;
  fitting the determined one or more spectral characteristic values and the target value together.

In one application of the invention, the fitting is done using a linear least squares method or neural network calculation.

In one application of the invention, the determining the area of interest comprises the removal of at least one of the following with a processor: one or more edge zones of the read digital frame, one or more crack zones and one or more carbon particle zones.

In one application of the invention, each spectral characteristic value includes one of the following: redness in relation to overall intensity, blueness in relation to overall intensity, yellowness in relation to overall intensity, standard deviation of redness, average gradient, and average hue.

In one application of the invention, the digital frame involves sampling information comprising at least one of the following: an identification of the sampling point of the chemical smelt sample represented in the frame and the sampling time of the chemical smelt sample represented in the frame.

In one application of the invention, the determined reduction rate of the recovery boiler is used to control the said recovery boiler.

With a solution in accordance with the invention, even a smelt spout-specific measurement method may be achieved in order to respond to combustion disturbances significantly faster than previously and, based on reduction measurements, optimise the combustion process in the combustion chamber also locally.

At least some solutions in accordance with the invention enable a good enough measurement to monitor changes in the reduction rate of individual smelt spouts so that the result is comparable between spouts. In situations where the spout-specific reduction rate of the smelt spouts cannot be specified reliably enough, the spout-specific reduction rate values can be combined by calculating the average of the spout-specific reduction results.

The reduction rate result of the smelt spout gives spout-specific reduction rates, which can be used to control the operation of the recovery boiler furnace locally. The controls of the fuel and air feed balance the operation of the boiler, which, among other things, improves the steam production and chemical circulation of the recovery boiler. Steady combustion also reduces the contamination of the recovery boiler and dangerous smelt surges.

The smelt spout reductions can be used to calculate an average reduction rate, in which case the present invention may save laboratory costs and time. Time saving enables the recovery boiler to be more quickly adjusted to its operating range, which increases the amount of production and quality.

Further, at least some solutions in accordance with the invention enable the assessment and comparison of, for example, temporally/spatially different determination/measurement results of the reduction rate of the recovery boiler as well as objective measurement data and measurement history data. For example, at least some solutions in accordance with the invention enable a comparable result to be achieved in less than 5 minutes, and the time-stamped result is saved and can be compared with other reduction samples or any other data.

Further, at least some solutions in accordance with the invention enable reduction sampling to be easily reproduced and automated. Automation enables, for example, a high monitoring frequency and quick inspection if the measured reduction rate essentially deviates from the expected value.

Preferably, a normal visible region colour camera can be used as a camera that provides results with a sufficiently good correlation. The colour camera may be supplemented or replaced by an infrared and/or spectral camera, the spectral characteristic values of which are used in determining the reduction rate.

LIST OF FIGURES

The following describes the invention with the enclosed application examples by referring to the enclosed drawing in which FIG. 1 schematically describes a system in accordance with the invention FIG. 2 schematically describes a device in accordance with the invention FIG. 3 schematically describes a method in accordance with the invention FIG. 4A describes a sampler in accordance with the invention FIG. 4B schematically describes a digital frame in accordance with the invention.

The enclosed drawing uses same reference numbers throughout to refer to equivalent elements.

DETAILED DESCRIPTION OF THE INVENTION

Below is a detailed description of the embodiments of the present invention, examples of which are described in the enclosed drawing. The below detailed description, together with the enclosed drawing, is intended to describe examples and not to represent the only ways to implement the provided examples or utilise them. The following highlights example activities and series of stages/operations in order to assemble and use examples. The same or equivalent activities and stages/operations may, however, also be achieved through other examples.

Figure 1:
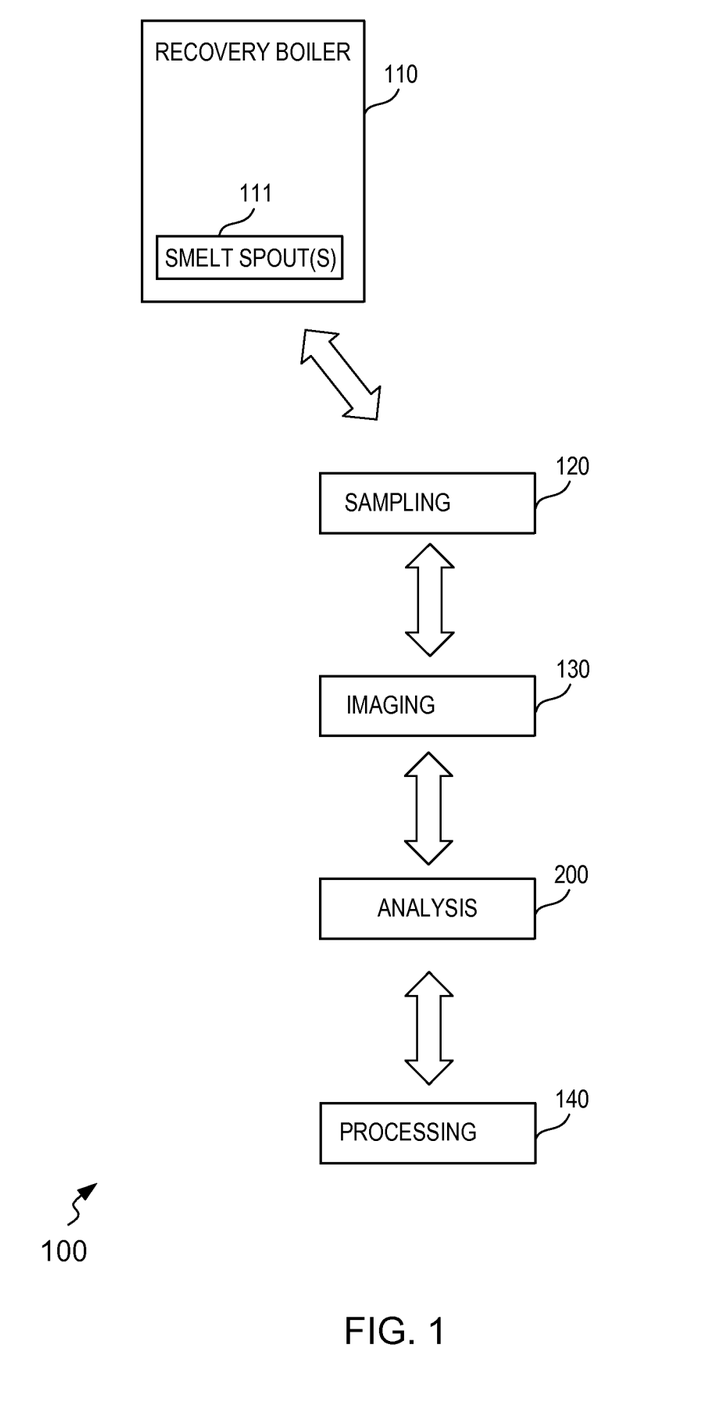

FIG. 1 describes, as an example, the components of a system 100 in accordance with the invention, in which system 100 different embodiments of the present invention may be implemented. The example in FIG. 1 presents the recovery boiler 110, sampler 120, means 130 for generating a digital frame from a chemical smelt sample taken from the recovery boiler 110 with the sampler 120, computer device 200 for determining the reduction rate of the recovery boiler from the sample taken and further processing instruments 140.

The recovery boiler 110 is a steam boiler designed to burn black liquor with a dual capacity to act as chemical recovery means and a unit suitable for producing high pressure steam and energy at a pulp mill. The bottom of the recovery boiler 110 furnace (not shown in FIG. 1) features one or more smelt spouts 111, through which chemical smelt containing sodium sulphide, sodium carbonate and sodium sulphate flows out. The reduction rate of the recovery boiler 110 indicates the amount of sodium sulphate reduced to sodium sulphide as a percentage.

In other words, the reduction rate of a recovery boiler can be determined as follows:

$$\text{reduction rate} = \frac{Na_2S}{Na_2S + Na_2SO_4}$$

in which $Na_2S$ is sodium sulphide (moles) and $Na_2SO_4$ is sodium sulphate (moles).

Figure 4A:
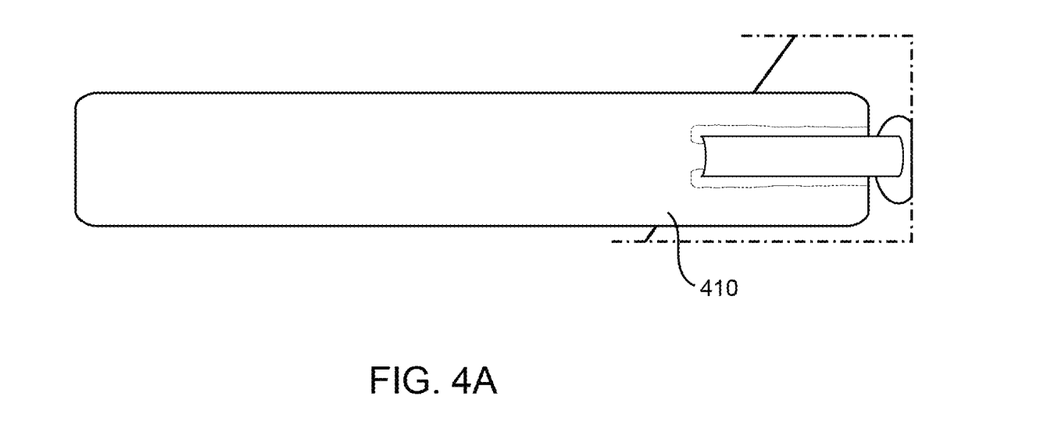

The sampler 120 may comprise, for example, a sampling bar, bowl or rod. A glass tube sample may also be analysed in accordance with the invention, in which case the same sample gives a reference value for calibration in the laboratory. In one example, the sampler 120 comprises a sampling bar with a flat, square head to be dipped in the chemical smelt flowing out of the smelt spout. The benefit of a flat bar is that no distortions caused by the shape will appear at the edges of the picture taken of it. A picture with distortions could, for example, be darker at the edges, which would affect the spectral characteristic values used in the calculation of the reduction rate. FIG. 4A shows an example of a sampling bar 410 in accordance with the invention with a flat, square head. In one example, the sampler 120 can be preheated. In the preheated sampler 120, the coating of the sampler with smelt is more even and moisture will not affect sampling. After preheating, the temperature of the sampler 120 is typically around 300-400° C.

In one example, after cleaning and preheating the sampler 120, the sampler 120 is taken under the smelt flow again with the aim to get an even coat by quickly dipping it to the smelt flow. When the head of the sampler 120 is entirely covered by smelt, it is lifted off and the smelt is allowed to solidify on the surface of the head of the sampler 120. After sampling, the sampler 120 is taken to the imaging means 130 (for example, a sampling station), where a picture is taken of it. During the transfer and photographing, the sample is preferably protected from oxidation with protective gas.

In one example, the sampler 120 is manually operated. In another example, the sampler 120 is automated, for example, using a robot or manipulator.

The means 130 for generating a digital frame may comprise, for example, a sampling station including a camera, a photo booth and a stand for the sampler 120. The camera may comprise, for example, a digital camera or an analogue camera. In the case of an analogue camera, the means 130 may comprise instruments to digitise the resulting analogue picture. In one example, the camera is the camera of a smart phone, tablet or similar. In one example, the camera is an industrial camera. In one example, the camera is a visible region colour camera. In one example, the camera is an infrared camera. In one example, the camera is a spectral camera, such as an infrared spectral camera.

In one example, the sampler 120 is set in the stand in the sampling station so that its head coated with smelt always enters the photo booth in the same position (e.g. horizontally). In one example, the sampler 120 is photographed within approximately half an hour from drawing the smelt sample in order to keep the effects of any oxidation as small as possible. In one example, the sampler 120 is photographed so that the sample of the sampler 120 is in the middle of the picture.

In one example, the photo booth is illuminated, for example, with near-natural lighting. In one example, the colour temperature of the lighting is approx. 4,000 K, illumination level approx. 10,000 lux and colour rendering index (Ra) approx. 95. For photographing at different wavelengths from that of visible light, a light source suitable for the particular application is used. A sufficiently hot sample may be self-illuminating, in which case a light source is not needed. The conditions of sampling and photographing should be standardised to achieve the best correlation.

Figure 2:
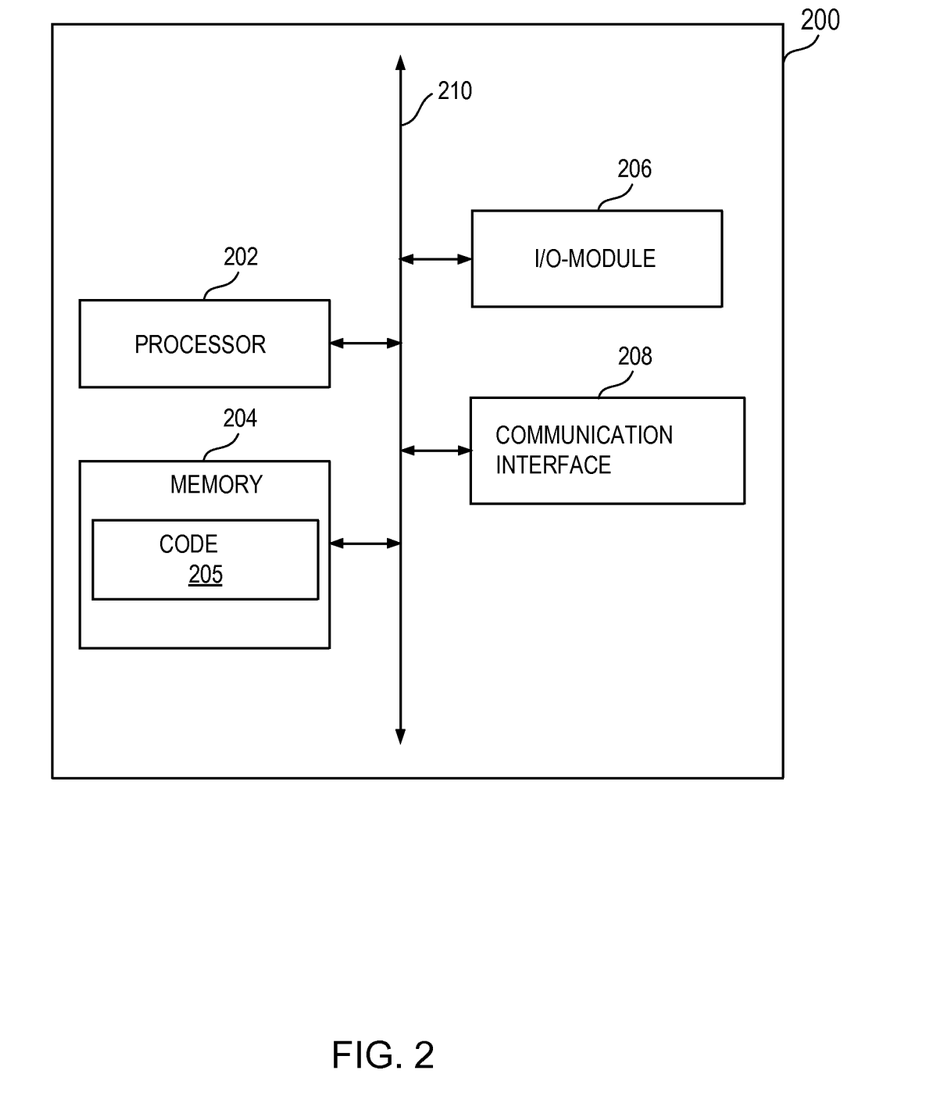

The computer device 200 used to determine the reduction rate of the recovery boiler is described in more detail in the description of FIG. 2.

The further processing instruments 140 may comprise, for example, workstation computers, server computers, databases and/or data links with which different further processing operations can be performed or launched (for example, the control of recovery boiler fuel feed and combustion air quantities at different levels to optimise combustion) utilising the specified reduction rate of the recovery boiler. In one example, the pictures taken and the analysis data can be processed with a suitable operating interface and/or through a suitable database, for example, in a process control system. In one example, segmented pictures can also be arranged for further processing operations or similar. Segmented picture here refers to a digital frame in which the area of interest is presented, for example, by an overlay generated on top of the original picture.

The reduction rate determination results may be used, for example, as measurement data in monitoring or control systems, measurement data in control circuits, data in Big Data processing, data in artificial intelligence solutions, data in IoT (Internet of Things) applications and data in statistical methods, the monitoring of combustion success (good reduction refers to a functioning combustion process resulting in a boiler that stays cleaner, a higher production level [vapour, chemical recovery] and a smaller need for cleaning vapour due to cleanness) and/or the monitoring of chemical circulation (good reduction refers to a high chemical recovery level). For example, high steady reduction helps the processing of green liquor in causticizing and at the lime sludge reburning kiln. Further, the amount of green liquor sludge is decreased with high reduction (sludge is hazardous waste).

FIG. 2 is a block diagram of a computer device 200 in accordance with one embodiment.

The computer device 200 comprises at least one processor 202 and one memory 204 containing computer program code 205. The computer device 200 may also comprise an input/output module 206 and/or a communication interface 208.

Although the computer device 200 in FIG. 2 is presented as including only one processor 202, the computer device 200 may include several processors. In one embodiment, commands 205 may be saved in the memory 204 (for example, operating system and/or different applications). In addition, the processor 202 can be used to implement saved commands. In one embodiment, the processor 202 may be implemented as a multicore processor, a single-core processor or a combination of one or more multicore processors and one or more single-core processors. The processor 202 may, for example, be implemented as one or more different processing devices, such as a coprocessor, microprocessor, controller, DSP (digital signal processor), processing circuit with or without a DSP or various other processing devices including an ASIC (application specific integrated circuit), FPGA (field programmable gate array), microcontroller unit, hardware accelerator or similar. In one embodiment, the processor 202 can be left to perform a hard-coded functionality. In one embodiment, the processor 202 has been implemented as an executor of software commands and the processor 202 can be configured with commands to run algorithms and/or operations described in this report when commands are run.

The memory 204 may be implemented as one or more volatile memory devices, one or more non-volatile memory devices and/or a combination of one or more volatile memory devices or one or more non-volatile memory devices. The memory 204 can be implemented, for example, as a semiconductor memory, such as PROM (programmable ROM), EPROM (erasable PROM), flash ROM, RAM (random access memory), etc.

The input/output module 206 has been arranged to assist in the organisation of input and/or output. The input/output module 206 has been arranged to communicate with the processor 202 and the memory 204. Examples of the input/output module 206 include but are not limited to an input interface and/or output interface. Examples of the input interface include but are not limited to a keyboard, touch screen, microphone, etc. Examples of the output interface include but are not limited to a speaker, display, such as a LED display, TFT display, liquid crystal display or AMOLED display, etc.

The communication interface 208 may enable the computer device 200 to communicate with other devices. In one embodiment, the different components of the computer device 200, such as the processor 202, memory 204, input/output module 206 and communication interface 208, have been arranged to communicate with each other through the centralised circuit 210. The centralised circuit 210 may comprise a pressed circuit board, such as a motherboard or equivalent.

The computer device 200 described and explained here is only an example of a device that may benefit from the embodiments of the invention, and it is not intended to limit the protective circuit of the invention. Note that the computer device 200 may include a different number of components than what is presented in FIG. 2. The computer device 200 can be divided into several physical units that communicate through a suitable communication link.

The above-mentioned memory/memories 204 and computer program code(s) 205 have been arranged with at least one processor 202 to make the computer device 200 read the digital frame at least part of which depicts the chemical smelt sample from the recovery boiler 110. In one embodiment, the computer device 200 receives a readable digital frame. In another embodiment, the computer device 200 retrieves a readable digital frame. In one example, one or more digital frames have been saved in a database from which the computer device 200 retrieves them. Such database can be integrated into the computer device 200 or separated from the computer device 200 and connected to it with a suitable communication link.

Figure 4B:
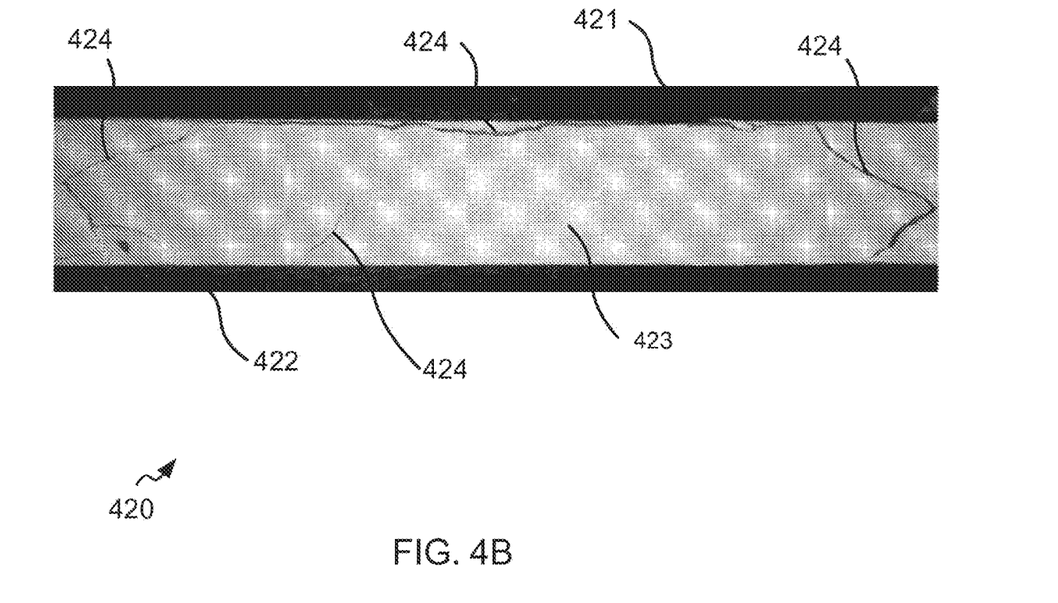

In one embodiment, the described chemical smelt sample is on the surface of the sampler 120. In one embodiment, the picture area of the digital frame includes some of the surroundings of the chemical smelt sample as well as the sample itself. FIG. 4B depicts one example of a digital frame 420 in accordance with the invention. The picture area of the digital frame 420 includes the chemical smelt sample area 423, upper edge area 421, lower edge area 422 and several crack areas 424.

The above-mentioned memory/memories 204 and computer program code(s) 205 have been further arranged with at least one processor 202 to make the computer device 200 specify an area of interest within the digital frame read comprising at least part of the area in the digital frame showing the chemical smelt sample. In one embodiment, the specification of the area of interest includes the removal of at least one of the following: one or more edge zones 421, 422 of the read digital frame, one or more crack zones 424 and one or more carbon particle zones (not shown in FIG. 4B). In other words, in specifying the interest area, unwanted areas that could distort the calculation of spectral characteristic values are excluded from the digital frame. The edge areas of the digital frame are unwanted, for example, when the area of the chemical smelt sample does not exceed to them. The crack areas and carbon particle areas are unwanted because they are darker than the chemical smelt sample area and can therefore distort the calculation of spectral characteristic values. In the specification of the interest area, information on the lightness/darkness of the pixels of the digital frame can be utilised, for example, so that areas darker than the defined threshold value are removed. In addition, a minimum size can be defined for the areas to be removed. In one embodiment, the area of interest is rectangular.

The above-mentioned memory/memories 204 and computer program code(s) 205 have been further arranged with at least one processor 202 to make the computer device 200 define, among the pixel values of the determined area of interest, one or more spectral characteristic values correlating with the change of reduction rate. In this text, a spectral characteristic value specifically refers to the value of a characteristic related to the spectrum of visible light and/or infrared radiation. In one example, the spectral characteristic value can also be affected by the characteristics of a surface reflecting visible light and/or infrared radiation, i.e. the chemical smelt surface. These characteristics may include the profile of the surface in question (smooth/rough) and whether the surface of the chemical smelt surface sample is matt or glossy. In one example, the spectral characteristic value comprises a value of a characteristic related to colour. In one embodiment, each spectral characteristic value to be defined comprises one of the following: redness in relation to overall intensity, blueness in relation to overall intensity, yellowness in relation to overall intensity, standard deviation of redness, average gradient and average hue.

In one example implemented with the wavelengths of visible light, the spectral characteristic values to be defined include one or more of the following:

redness in relation to the overall intensity = average ((red $RGB$ colour channel in the area of interest)/overall intensity)

blueness in relation to the overall intensity = average ((blue $RGB$ colour channel in the area of interest)/overall intensity)

yellowness in relation to the overall intensity = average ((red $RGB$ colour channel in the area of interest) + (green $RGB$ colour channel in the area of interest)/overall intensity)

standard deviation of red = standard deviation (red $RGB$ colour channel in the area of interest)

average gradient = average (square root ((gradient (3×3 Sobel) y − direction)^2 + (gradient (3×3 Sobel) x − direction) ^2));

here the gradient is calculated with a 3×3 Sobel kernel· average hue = average (Hue channel). The Hue channel corresponding to the hue can be obtained, for example, through an $RGB \rightarrow HSV$ tansformation.

In the above example, RGB refers to the RGB (red, green, blue) colour model and HSV refers to the HSV (hue, saturation, value) colour model.

It has been observed in experiments that, according to the sample material, the colour of the chemical smelt sample from the recovery boiler in low reduction rate pictures is usually brownish with some yellow and red. When moving towards high reduction rate pictures, the hue becomes greyer and the pictures exhibit blue tones as well. Usually, black and blue toned carbon particles in the chemical smelt sample indicate a good reduction rate.

Spectral characteristic values can be added to or removed from the calculation of the reduction rate depending on which spectral characteristic values give the best fit, i.e. which spectral characteristic values best indicate the reduction value in each situation.

The above-mentioned memory/memories 204 and computer program code(s) 205 have been further arranged with at least one processor 202 to make the computer device 200 specify the reduction rate of the recovery boiler 110 using the reduction rate function of one or more spectral characteristic values at predetermined weights. In other words, the determined spectral characteristic value or values are variables in the reduction rate function. In one example, the reduction rate function comprises the summation of the determined spectral characteristic value or values at predetermined weights.

In one example, the reduction rate function comprises the following:

Reduction rate = rounding to interger (redness in relation to the overall intensity * weighting coefficient of redness + blueness in relation to the overall intensity * weighting coefficient of blueness + yellowness in relation to the overall intensity * weighting coefficient of yellowness + standard deviation of red * weighting coefficient of the standard deviation of red + avarage gradient * weighting coefficient of average gradient + average hue * weighting coefficient of avarage hue + constant term).

Further, in one example, the weighting coefficients include the following:

weighting coefficient of redness = 30.2334572, weighting coefficient of blueness = 414.549091, weighting coefficient of yellowness = 32.4228204, weighting coefficient of the standard deviation of red = 0.79065124, weighting coefficient of average gradient = −0.469628029, weighting coefficient of average hue = −0.187562146 and constant term = −304.008636.

In one embodiment, this predetermining of weights consists of using a laboratory measurement of the chemical smelt sample of the recovery boiler to determine the reduction rate of the recovery boiler to be used as the target value. In addition, one or more digital calibration frames are produced as reference material showing the above-mentioned chemical smelt sample of the recovery boiler, and the above-mentioned spectral characteristic value or values are determined. Sampling for the calibration frame and the laboratory sample is carried out as simultaneously as possible to eliminate process variation. After this, the determined spectral characteristic value(s) and the determined target value are fitted together. In one example, the determined spectral characteristic value(s) and the reduction rate target value are fitted together by defining weights for the mentioned colour value(s). The weights are used to calculate the reduction rate target value from the reduction rate function.

In one example, the laboratory measurement comprises a laboratory analysis of a glass tube sample. In one example of glass tube sampling, the glass tube is manually passed into the smelt flow with a sampling arm, lifted out and plugged to reduce oxidation defect. The sample is analysed in the laboratory. The same sample can also be analysed in accordance with the invention.

In one embodiment, the fitting is done using the method of least squares (for example, the linear method of least squares). In other words, a linear least squares fit, for example, is performed between the calculated spectral characteristic values and the laboratory measurements.

In another embodiment, neural network calculation is used for fitting. In one example, the calculated spectral characteristic values act as the input of the neural network and the reduction rate value acts as the output. Calculated spectral characteristic values and laboratory measurements can be used as training material for neural networks. In one example, the neural network comprises a fully connected neural network.

In other words, the weighting coefficients of different spectral characteristic values are fitted into laboratory measurements in the calculation, and the best possible fit is sought based on the accumulated reference material so that the measurement inaccuracy is as low as possible. Spectral characteristic values can be added to or removed from the reduction rate function depending on which spectral characteristic values give the best fit for the result, i.e. which spectral characteristic values best indicate the change of reduction rate. In one example, the reduction rate function is fitted plant-specifically and/or in accordance with the raw material of the plant.

The fitting gives a reduction rate function in which a weighting coefficient has been defined for each spectral characteristic value based on the fitting. After this, the weighting coefficients can be used to calculate the reduction rate without actual laboratory analyses. Results achieved during operation in accordance with the invention can be compared to laboratory samples of the same time and sampling point in order to update the reduction rate function as necessary.

In one embodiment, the digital frame involves sampling information comprising at least one of the following: the identification of the sampling point (such as a smelt spout) of the chemical smelt sample shown by the frame and the sampling time of the chemical smelt sample shown by the frame (for example, a time stamp). The use of time stamps and other similar things enables, for example, the creation of a time-stamped trend that can be viewed for a desired time period.

In one application of the invention, the determined reduction rate of the recovery boiler is used to control the said recovery boiler, for example, to control the fuel feed of the recovery boiler and the combustion air quantities of different levels in order to optimise combustion.

Figure 3:
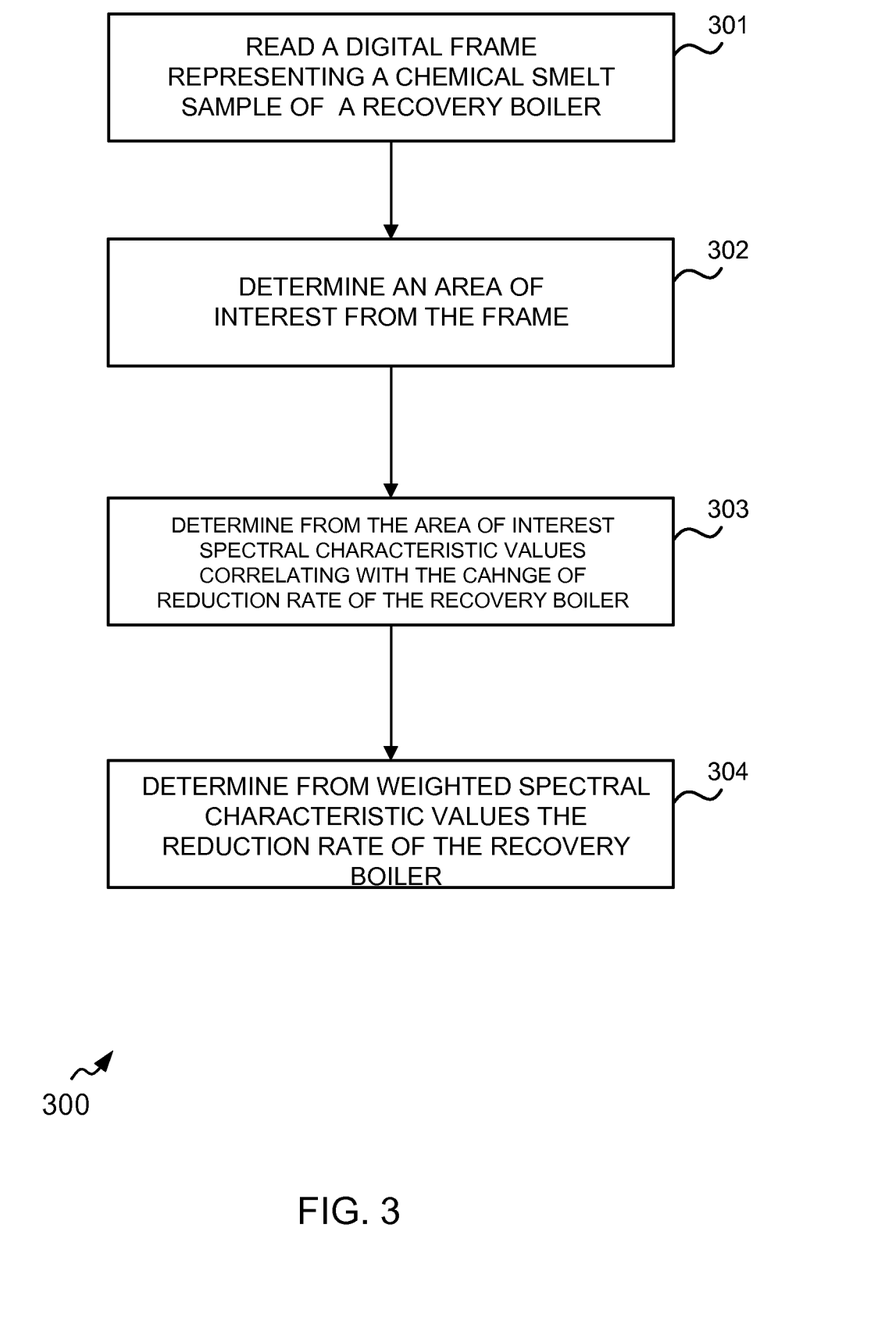

FIG. 3 shows an example flow chart of a method 300 to specify the reduction rate of the recovery boiler in accordance with the example embodiment.

In operation 301, a processor is used to read a digital frame at least part of which shows the chemical smelt sample of the recovery boiler.

In operation 302, within the digital frame read with a processor, an area of interest is determined comprising at least part of the area in the digital frame showing the chemical smelt sample.

In operation 303, of the pixel values of the area of interest determined with a processor, one or more spectral characteristic values correlating with the change of reduction rate are determined.

In operation 304, the reduction rate of the recovery boiler is determined with a processor using the reduction rate function of one or more of the determined spectral characteristic values at predefined weights.

The method 300 can be performed with the device 200 of FIG. 2. The additional characteristics of the method 300 are direct results of the operations and parameters of the device 200, so they are not repeated here. The method 300 can be performed with a computer program/computer programs.

Example embodiments may include, for example, any suitable computer devices and equivalent that are capable of running processes of example embodiments. The devices and subsystems of example embodiments can communicate with each other using any suitable protocol, and they can be implemented using one or more programmed computer systems or devices.

One or more connection mechanisms, including an Internet connection, telecommunication in any suitable format (voice, modem, etc.), wireless communication media and equivalent, can be used with the example embodiments. The communication networks or connections may include, for example, one or more satellite communication networks, wireless communication networks, cellular communication networks, 3G communication networks, 4G communication networks, 5G communication networks, a general switched telephone network, package data networks, the Internet, intranets or combinations of these.

Let it be understood that the example embodiments are just examples because the many variations of the specific means used to implement the example embodiments are possible, as professionals of the field understand. For example, the functionality of one or more components of the example embodiments can be implemented through hardware and/or software.

The example embodiments can save information related to the different processes described in this report. This information can be saved in one or more memories, such as a hard disk, optical disk, magnetic-optical disk, RAM memory, etc. Information used to implement the example embodiments of the present invention can be saved in one or more databases. Databases can be organised using data structures (for example, data records, tables, boards, fields, graphs, trees or lists) included in one or more memories or storage media listed here. As regards example embodiments, the described processes may include appropriate data structures for saving the data collected and/or generated by processes of devices and subsystems of the example embodiments into one or more databases.

The example embodiments may be implemented in whole or in part using one or more general-purpose processors, microprocessors, DSP processors, microcontrollers, etc. programmed in accordance with the teachings of the example embodiments of the present invention, as professionals of the field understand. An average programmer can easily produce appropriate software based on the teachings of the example embodiments, as professionals of the software field understand. In addition, the example embodiments can be implemented using application-specific integrated circuits or combining conventional component circuits of the appropriate network, as professionals of the electronics field understand. Therefore, the example embodiments are not limited to any specific combination of hardware and/or software.

Saved in any computer-readable media or a combination thereof, the example embodiments of the present invention may comprise software for controlling the components of the example embodiments, running components of the example embodiments, enabling interaction between components of the example embodiments and human users, etc. Such software may include but is not limited to device drivers, firmware, operating systems, software development tools, application software, etc. These computer-readable media may include the computer program product of the embodiment of the present invention for executing processes in the implementation of the invention in whole or in part (if processing is distributed). The computer devices of the example embodiments of the present invention may include any suitable interpretable or executable code mechanisms, including but not limited to command scripts, interpretable programs, dynamic link libraries, Java classes and applets, entirely executable programs, etc. In addition, parts of the processing of the example embodiments of the present invention may be distributed in order to improve performance, reliability, costs, etc.

As stated above, components of the example embodiments may include a computer-readable medium or memory to store commands programmed according to the teachings of the present invention as well as data structures, tables, data records and/or other data described in this report. The computer-readable medium may comprise any suitable medium that participates in organising commands to be performed by the processor. Such medium may have several forms, including but not limited to a non-volatile or permanent storage medium, volatile or non-permanent storage medium, etc. Non-volatile storage media may comprise optical or magnetic disks, etc. Volatile storage media may comprise dynamic memories, etc. General forms of computer-readable media may include a floppy disk, hard drive or any other medium that can be read by a computer.

The invention is not limited to concern only the application examples described above; many variations are possible within the framework of the invention idea specified by the patent claims.

The invention claimed is:

1. A method for determining a reduction rate of a recovery boiler comprising:
   obtaining a chemical smelt sample from smelt that flows from the recovery boiler;
   capturing a digital frame of an image of the chemical smelt sample;
   reading with a processor the digital frame including an area within the image which represents the chemical smelt sample of the recovery boiler;
   determining from the digital frame an area of interest within the image comprising at least part of the area in the digital frame representing the chemical smelt sample;
   determining with the processor and from pixel values of the area of interest one or more spectral characteristic values;
   determining with the processor a reduction rate of the recovery boiler based on the one or more spectral characteristic values and using a reduction rate function to correlate the one or more of the spectral characteristic values to corresponding predetermined weights used to determine the reduction rate, and
   controlling the recovery boiler using the reduction rate.

2. The method according to claim 1, wherein the reduction rate function correlates the one or more spectral characteristic values to a corresponding weight, and the method further comprising determining the predetermining weights by:
   determining with a laboratory measurement of a chemical smelt sample of the recovery boiler to determine a reduction rate of the recovery boiler to be used as a target value;

producing a digital calibration frame representing said chemical smelt sample of the recovery boiler and determining said one or more spectral characteristic values; and fitting the one or more spectral characteristic values and the target value together.

3. The method according to claim 2, wherein the fitting is performed using a linear least squares method or a neural network calculation.

4. The method according to claim 1, wherein the determining the area of interest comprises removal, by the processor, of at least one of: one or more edge zones of the digital frame, one or more crack zones of the digital frame, or one or more carbon particle zones of the digital frame.

5. The method according to claim 1, wherein each of the one or more spectral characteristic value comprises at least one of:
- a redness in the area of the area of interest in relation to an overall intensity in the area of interest,
- a blueness in the area of interest in relation to the overall intensity,
- a yellowness in the area of interest in relation to the overall intensity,
- a standard deviation of the redness,
- an average gradient of the redness, the blueness or the yellowness, or
- an average hue in the region of interest.

6. The method according to claim 1, wherein the reading of the digital frame involves sampling information comprising at least one of: an identification of a sampling point of the chemical smelt sample represented in the digital frame, or a sampling time of the chemical smelt sample represented in the digital frame.

7. A method to control a recovery boiler comprising:
obtaining a chemical smelt sample from smelt that flows from the recovery boiler;
capturing a digital frame of an image of the chemical smelt sample;
identifying an area of interest within the digital frame comprising at least part of an area in the digital frame representing the chemical smelt sample;
analyzing in the area of interest to determine a spectral characteristic value of the chemical smelt sample shown in the area of interest;
calculating a reduction rate of the chemical smelt sample by using the spectral characteristic and a reduction rate function that correlates spectral characteristic values or data representing spectral characteristic values to reduction rates of chemical smelt, and
controlling the recovery boiler based on the reduction rate.

8. The method according to claim 7, wherein the reduction rate function correlates each of the spectral characteristic values to a corresponding weight, and the method further comprises:
determining the weights corresponding to the spectral characteristic values by:
performing a laboratory measurement of a chemical smelt test sample taken from the recovery boiler to determine a target value reduction rate of the recovery boiler;
capturing a digital calibration frame of an image of the chemical smelt test sample;
identifying at least one of the one or more spectral characteristic values from the digital calibration frame; and
correlating the one or more spectral characteristic values identified in the digital calibration frame to the target value to determine the weight.

9. The method according to claim 8, wherein the correlating includes using a linear least squares method or a neural network calculation.

10. The method according to claim 7, wherein the determining the area of interest includes removing at least one of one or more edge zones of the digital frame, one or more crack zones of the digital frame, or one or more carbon particle zones of the digital frame.

11. The method according to claim 7, wherein the spectral characteristic value comprises at least one of:
- a redness in the area of the area of interest in relation to an overall intensity in the area of interest,
- a blueness in the area of interest in relation to the overall intensity,
- a yellowness in the area of interest in relation to the overall intensity,
- a standard deviation of the redness,
- an average gradient of the redness, the blueness or the yellowness, or
- an average hue in the area of interest.

12. The method according to claim 7, wherein the reading of the digital frame involves sampling information comprising at least one of: an identification of a sampling point of the chemical smelt sample represented in the digital frame, or a sampling time of the chemical smelt sample represented in the digital frame.

* * * * *